United States Patent
Wenger

(10) Patent No.: US 10,314,233 B2
(45) Date of Patent: Jun. 11, 2019

(54) STALK ROLL FOR A ROW UNIT OF AN AGRICULTURAL HARVESTER

(71) Applicant: CNH Industrial America LLC, New Holland, PA (US)

(72) Inventor: Bradley Wenger, Lancaster, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 511 days.

(21) Appl. No.: 14/813,666

(22) Filed: Jul. 30, 2015

(65) Prior Publication Data
US 2017/0027105 A1 Feb. 2, 2017

(51) Int. Cl.
*A01D 57/22* (2006.01)
*A01D 45/02* (2006.01)

(52) U.S. Cl.
CPC .......... *A01D 57/22* (2013.01); *A01D 45/021* (2013.01); *A01D 45/025* (2013.01)

(58) Field of Classification Search
CPC ..... A01D 57/22; A01D 45/021; A01D 45/025
See application file for complete search history.

(56) References Cited

U.S. PATENT DOCUMENTS

| | | | | |
|---|---|---|---|---|
| 863,812 A | * | 8/1907 | Stone | A01D 45/025 460/32 |
| 914,465 A | * | 3/1909 | Stone | A01D 45/025 460/32 |
| 992,287 A | * | 5/1911 | Stone | A01D 45/025 460/32 |
| 1,226,718 A | * | 5/1917 | Stone | A01D 45/025 460/32 |
| 1,226,719 A | * | 5/1917 | Stone | A01D 45/025 460/32 |
| 1,295,255 A | | 2/1919 | Baird | |
| 1,647,936 A | * | 11/1927 | Schuld | A01D 45/025 460/28 |
| 1,682,143 A | * | 8/1928 | Paradise | A01D 45/025 460/32 |
| 2,219,483 A | * | 10/1940 | Lukes | A01D 45/025 460/31 |
| 2,315,950 A | * | 4/1943 | Fitzloff | A01D 45/025 460/32 |
| 2,534,685 A | | 12/1950 | Shrader | |
| 2,584,180 A | | 2/1952 | Aasland | |

(Continued)

FOREIGN PATENT DOCUMENTS

| | | | | |
|---|---|---|---|---|
| EP | 2702855 A1 | 3/2014 | | |
| EP | 3123854 A1 | * 2/2017 | ........... | A01D 45/025 |
| WO | 2012023083 A1 | 2/2012 | | |

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

A row unit for a header of an agricultural harvester is provided that includes a frame and two spaced apart stripping plates. The row unit further includes a first stalk roll mounted to the frame adjacent the first stripping plate and a second stalk roll mounted to the frame adjacent the second stripping plate. The first stalk roll includes a primary helical flight having a front end that starts at a front edge of the first stalk roll and the second stalk roll includes a secondary helical flight having a front end that starts at a position axially spaced from a front edge of the second stalk roll.

18 Claims, 13 Drawing Sheets

(56) References Cited

U.S. PATENT DOCUMENTS

| | | | |
|---|---|---|---|
| 2,618,113 A * | 11/1952 | Hyman | A01D 45/025 |
| | | | 460/29 |
| 2,737,185 A | 3/1956 | Siemen | |
| 2,863,275 A | 12/1958 | Searles | |
| 2,881,579 A | 4/1959 | Aasland | |
| 3,126,690 A * | 3/1964 | Keller et al. | A01D 45/025 |
| | | | 56/107 |
| 3,858,384 A * | 1/1975 | Maiste | A01D 45/025 |
| | | | 56/104 |
| 4,809,714 A | 3/1989 | Recker | |
| 5,282,352 A | 2/1994 | Schoolman | |
| 6,341,481 B1 | 1/2002 | van der Merwe | |
| 9,386,747 B2 * | 7/2016 | Madheswaran | A01D 91/04 |
| 2011/0041472 A1 | 2/2011 | Rottinghaus | |
| 2011/0173942 A1 * | 7/2011 | Kowalchuk | A01D 45/021 |
| | | | 56/62 |
| 2012/0042621 A1 | 2/2012 | Lohrentz et al. | |
| 2012/0204528 A1 | 8/2012 | Regier | |
| 2015/0319927 A1 * | 11/2015 | Madheswaran | A01D 57/22 |
| | | | 56/105 |

\* cited by examiner

STALK ROLL FOR A ROW UNIT OF AN AGRICULTURAL HARVESTER

BACKGROUND

The subject application relates generally to stalk rolls for row units for use with agricultural harvesters. In particular, the subject application relates to a pair of stalk rolls each having a helical flight wherein one helical flight is axially displaced relative to the other in order to provide efficient processing of crop stalks therebetween.

Agricultural harvesters provide for efficient harvesting of crops such as corn. When configured for corn harvesting an agricultural harvester generally includes a corn header which separates crop material (i.e., ears of corn) from corn stalks. The removed ears of corn are fed into a separator which separates the grains of corn from all other materials other than grain ("MOG"). A typical corn header includes several row units, one for each row being harvested in a single pass over a field. As the corn header moves forward, a corn plant in each row of corn enters the forwardly extending channel defined by the particular row unit associated with that row. Generally each row unit includes a stripping plate with a gap ("stripping plate gap") that is wide enough to receive the corn stalk, but not wide enough for the ear of corn on the stalk to pass through. As the harvester moves forward, the stripping plates exert a backward and upward force on the ear of corn while the row unit stalk rolls pull the corn downwardly.

Below the stripping plate in each corn header unit are a pair of stalk rolls that are positioned on each side of the stripping plate gap. In a typical configuration a stalk roll is made up of a stalk roll spiral and a back section. The stalk roll spiral has helical flights that extend from a central cylinder. The back section extends rearwardly from stalk roll spiral. The stalk rolls are aligned so that the axes of the stalk rolls are parallel to the stripping plate gap. Typically the stalk rolls rotate in opposite directions to exert a downward and rearward force on the stalk relative to the stripping plate. The generally opposing forces exerted by the stalk rolls and stripping plates on the stalk and ear respectively act to separate the ear of corn from the stalk. The ears and any MOG are transported into the harvester or combine for further processing while the stalk generally remains rooted in the ground.

BRIEF SUMMARY

In accordance with a first aspect, the subject application provides a row unit for a header of an agricultural harvester including a frame and first and second spaced apart stripping plates mounted on the frame. The row unit further includes a first stalk roll mounted to the frame adjacent the first stripping plate and a second stalk roll mounted to the frame adjacent the second stripping plate. The first stalk roll includes a primary helical flight having a front end that starts at a front edge of the first stalk roll and the second stalk roll includes a secondary helical flight having a front end that starts at a position axially spaced from a front edge of the second stalk roll. The first stalk roll further includes a secondary helical flight having a front end starting at a position axially spaced from the front edge of the first stalk roll, and the second stalk roll further includes a primary helical flight having a front end starting at the front edge of the second stalk roll.

In accordance with a second aspect, the subject application provides a stalk roll for a row unit of a header of an agricultural harvester including a cylindrical body, a first helical flight having a front end starting at a front edge of the cylindrical body, and a second helical flight having a front end starting at a position axially spaced from the front edge of the cylindrical body.

In accordance with a third aspect, the subject application provides a stalk roll for a row unit of a header of an agricultural harvester including a central body, a first helical flight having a front end starting at a first position axially spaced from a front edge of the central body, and a second helical flight having a front end starting at a second position axially spaced from the front edge of the central body. The central body includes a first cylinder having a first diameter and a second cylinder having a second diameter greater than the first diameter.

In accordance with a further aspect the subject application provides for a stalk roll flighting design that improves the efficiency of the stalk roll. In particular, the flighting design improves the engagement of the stalk roll spirals with corn stalks. This design acts to prevent the agricultural harvester from driving over corn that does not engage with the stalk rolls. By alternating the starting position of the flighting, from the edge of the stalk roll to an axial distance from the edge (e.g., one inch), a gap or pocket is created that invites the corn stalk into the spirals of the stalk rolls. Once the stalk enters that gap or pocket of the spiral, the flighting of the stalk rolls engages the stalk and conveys it further down the length of the stalk roll.

In particular, a pair of stalk rolls is provided with flightings, one stalk roll having a flighting starting at a front edge of the stalk roll and another stalk roll having a flighting starting at a point recessed from the front edge of the stalk roll. By alternating the starting positions of the two flightings a gap or pocket is created that invites a processed corn stalk into the stalk roll spiral. Upon entering that gap or pocket of the stalk rolls, the stalk rolls' flighting engages the stalk and conveys it towards the back section of the stalk roll.

In accordance with another aspect of the subject application the stalk roll includes a central body, a first helical flight and a second helical flight. The first helical flight has a front end that starts at a front edge of the stalk roll. The second helical flight has a front end that starts at a point axially spaced by a fixed distance from the front edge of the central body of the stalk roll. In accordance with certain aspects the front end of the first helical flight may start at a position on the central body that is in a diametrically opposite position in relation to the front end of the second helical flight on the central body (alternatively referred to as a cylindrical body). The front edge of each of the stalk rolls is positioned as to be parallel and the same distance from a back most end of the header in which the row unit is mounted.

The subject application provides a row unit for a header of an agricultural harvester comprising a frame, and first and second spaced apart stripping plates mounted on the frame characterized by a first stalk roll and a second stalk roll. The first stalk roll is mounted to the frame adjacent the first stripping plate. The first stalk roll includes a primary helical flight having a front end starting at a front edge of the first stalk roll. The second stalk roll (38*b*) is mounted to the frame adjacent the second stripping plate. The second stalk roll includes a secondary helical flight having a front end starting at a position axially spaced from a front edge of the second stalk roll.

The subject application provides stalk roll for a row unit of a header of an agricultural harvester comprising a central body, a first helical flight on the central body and a second helical flight on the central body, characterized in that the second helical flight includes a front end starting at a position axially spaced from a front edge of the central body.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "corn," "ear," "stalk," and "crop material" are used throughout the specification for convenience and it should be understood that these terms are not intended to be limiting. Thus, "corn" refers to that part of a crop which is harvested and separated from discardable portions of the crop material.

Figure 1:
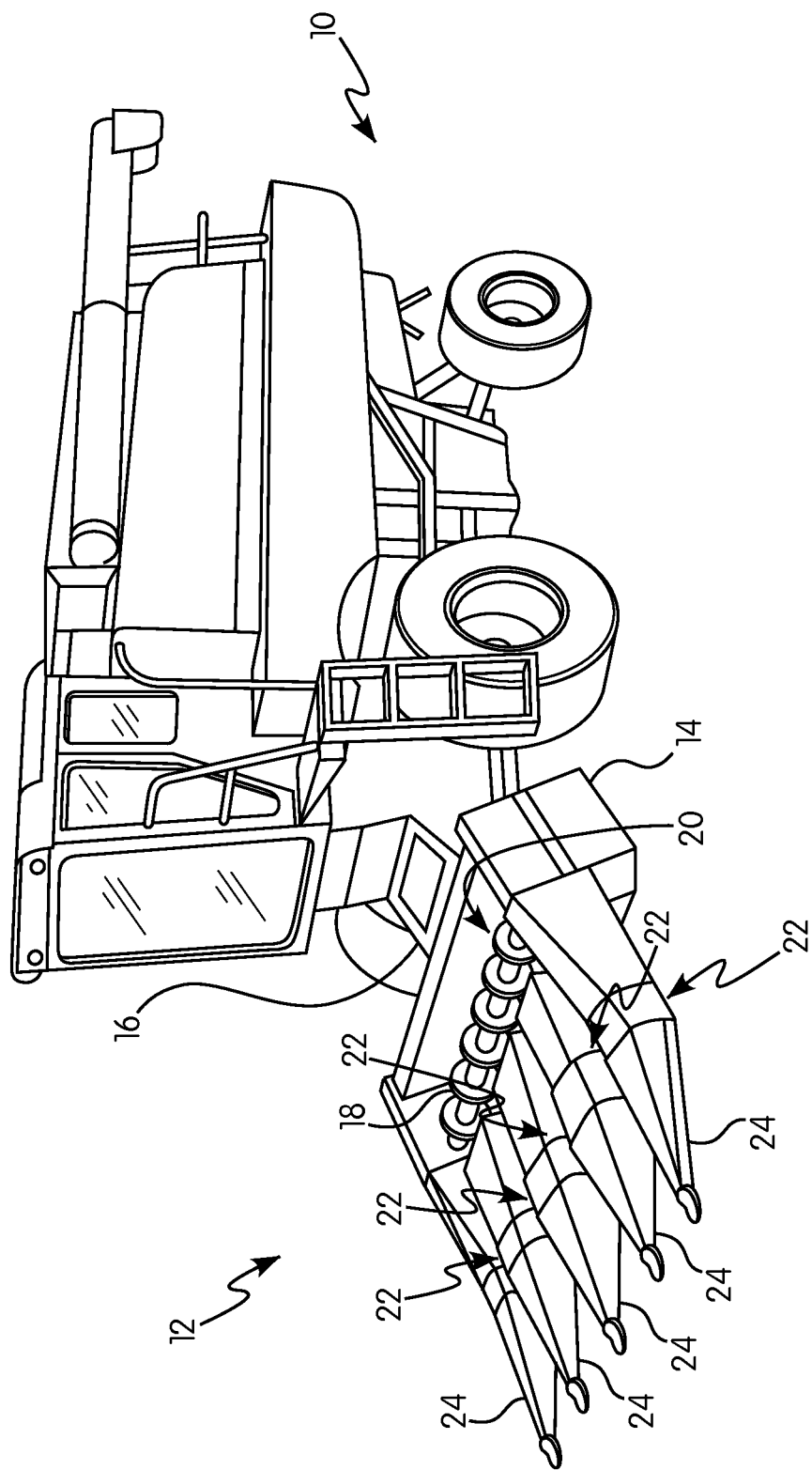
FIG. 1 is a perspective view of an agricultural harvester including a corn header according to an aspect of the subject application.

Referring now to the drawings wherein aspects of the subject application are shown, FIG. 1 illustrates corn header assembly 12 according to an aspect of the subject application as applied to agricultural harvester 10. The corn header assembly 12 is an improvement to current conventional corn header assemblies of agricultural harvesters by incorporating a stalk roll design that can allow for more efficient separation of ears of corn from corn stalks. The corn header assembly 12 is shown to be operatively connected to the agricultural harvester 10 for harvesting corn and feeding the corn to a feeder house 16 for receiving crop material and propelling the crop material rearwardly for further downstream processing within the combine. Such feeder houses and harvesting operations are known in the art and a further detailed description of their structure, function and operation is not necessary for a complete understanding of this particular aspect of the subject disclosure.

The corn header assembly 12 includes header frame 14 for mounting to a forward end of the agricultural harvester 10, a conveyor 18 (such as an auger) extending lengthwise across the header frame 14 for conveying crop material to a combine feeding location or feeder house 16 through channel 20 and a plurality of row units 22 extending forwardly from the header frame 14. The corn header assembly 12 further includes a plurality of row dividers 24 extending forward from the header frame 14. Such dividers 24 are known in the art and a further detailed description of their structure, function and operation is not necessary for a complete understanding of the subject application.

Figure 2:
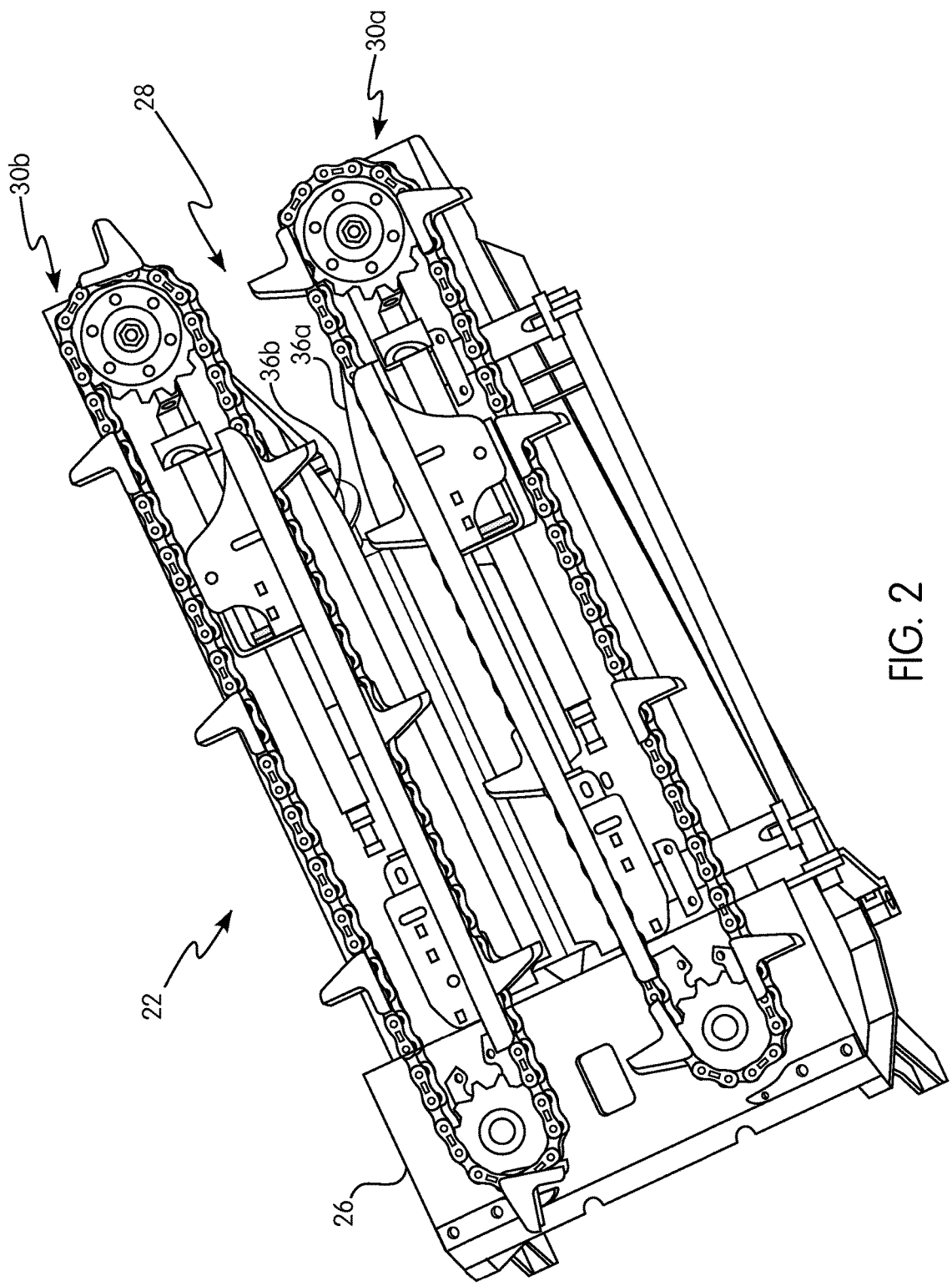
FIG. 2 is a top perspective view of a row unit of a corn header in accordance with the subject application with certain features omitted.
Figure 3:
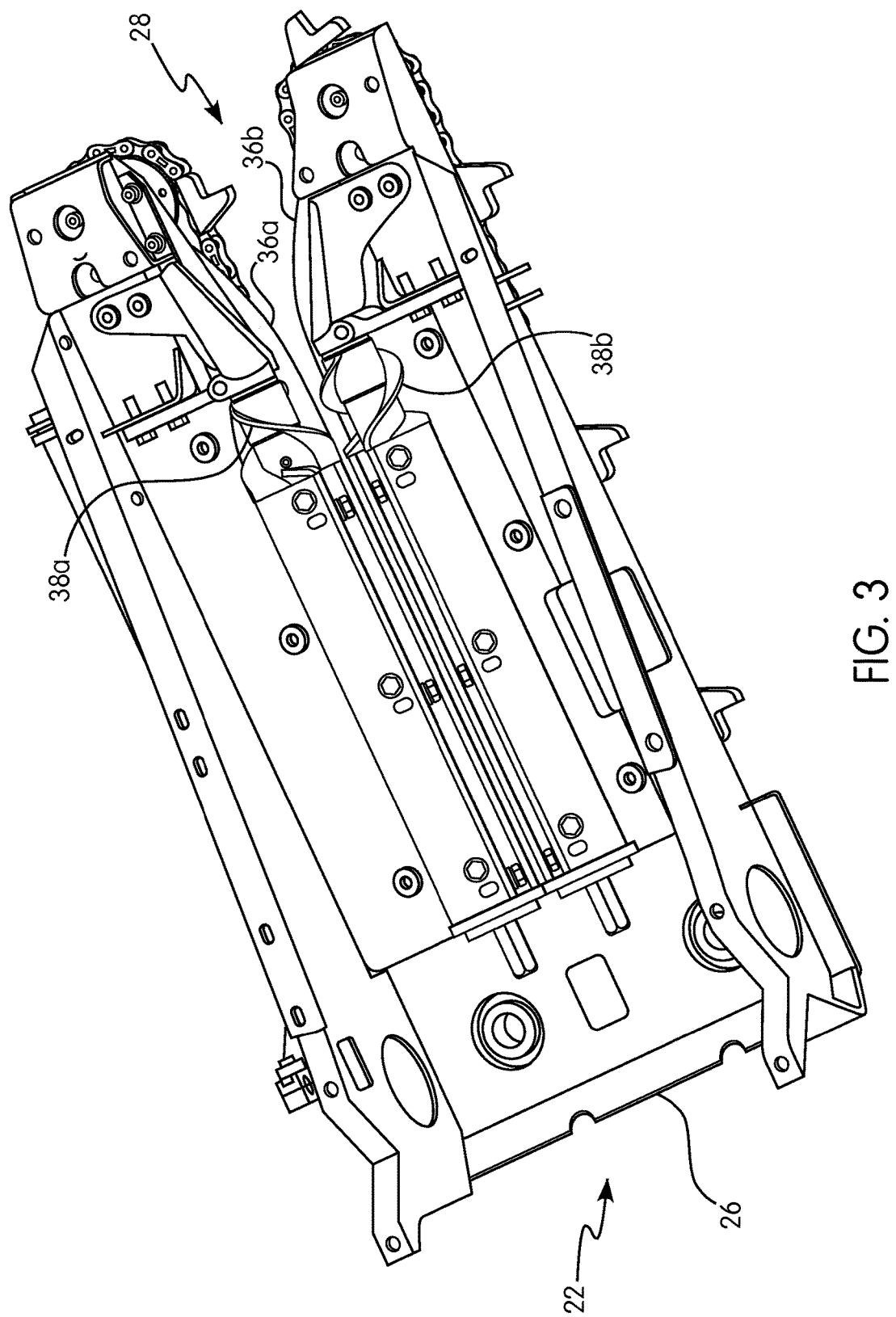
FIG. 3 is a bottom perspective view of the row unit of FIG. 2.

FIGS. 2 and 3 are perspective views from the top and the bottom respectively of various components of a single row unit 22 in accordance with the present aspect of the subject application. The row unit 22 includes frame 26 forming two row unit arms 30a, 30b and two stripping plates 36a, 36b which define a gap 28 therebetween. In FIG. 3, stalk rolls 38a, 38b are shown positioned adjacent to stripping plates 36a, 36b. As illustrated in FIG. 3, the front edges of the stalk rolls 38a, 38b are aligned about a plane perpendicular to a longitudinal axis of the stalk rolls. In other words, the front edges are aligned so as to be at the same position along a length of the stripping plate.

Figure 4:
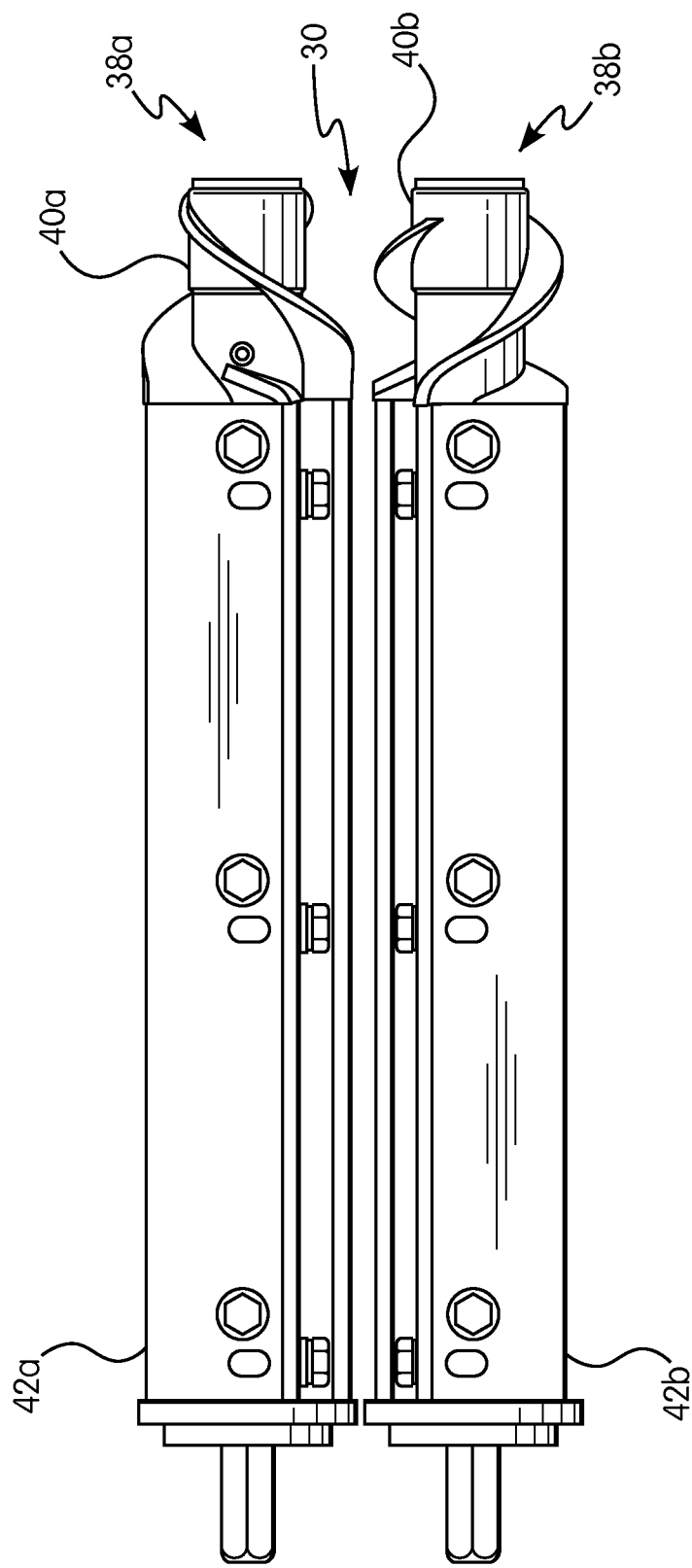
FIG. 4 is a bottom plan view of a pair of stalk rolls of the row unit of FIG. 3.
Figure 5:
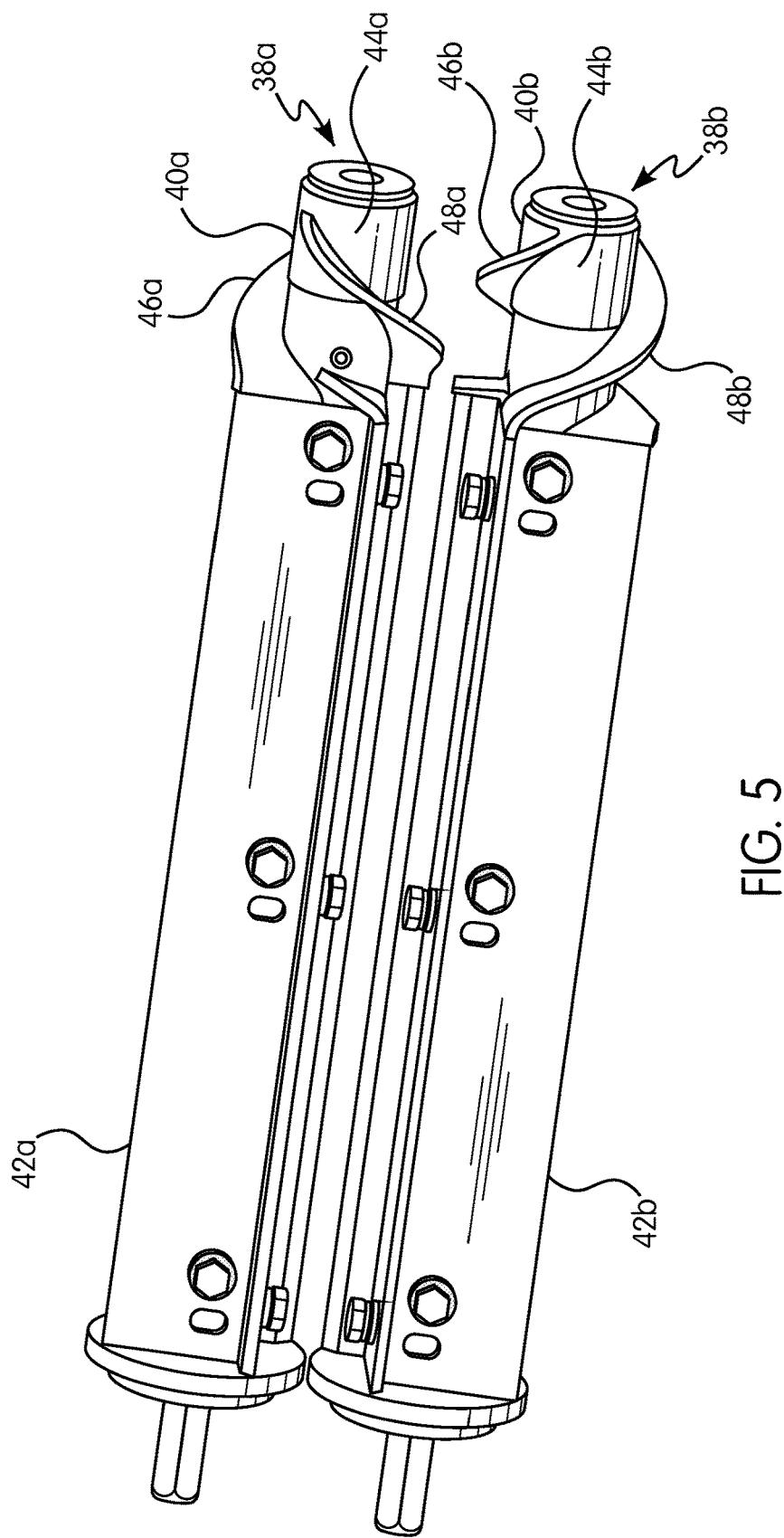
FIG. 5 is a perspective view of the stalk rolls of FIG. 4.

FIG. 4 is a bottom perspective view of stalk rolls 38a, 38b that include stalk roll spirals 40a, 40b respectively and back segments 42a, 42b. FIG. 5 shows stalk rolls 38a, 38b. Stalk roll 38a includes stalk roll spiral 40a and back segment 42a respectively. The stalk roll spiral includes a central body 44a and two helical flights, a first or primary helical flight 46a and a second or secondary helical flight 48a. Similarly, Stalk roll 38b includes stalk roll spiral 40b and back segment 42b respectively. The stalk roll spiral includes a central body 44b and two helical flights, a first or primary helical flight 46b and a second or secondary helical flight 48b.

Figure 6A:
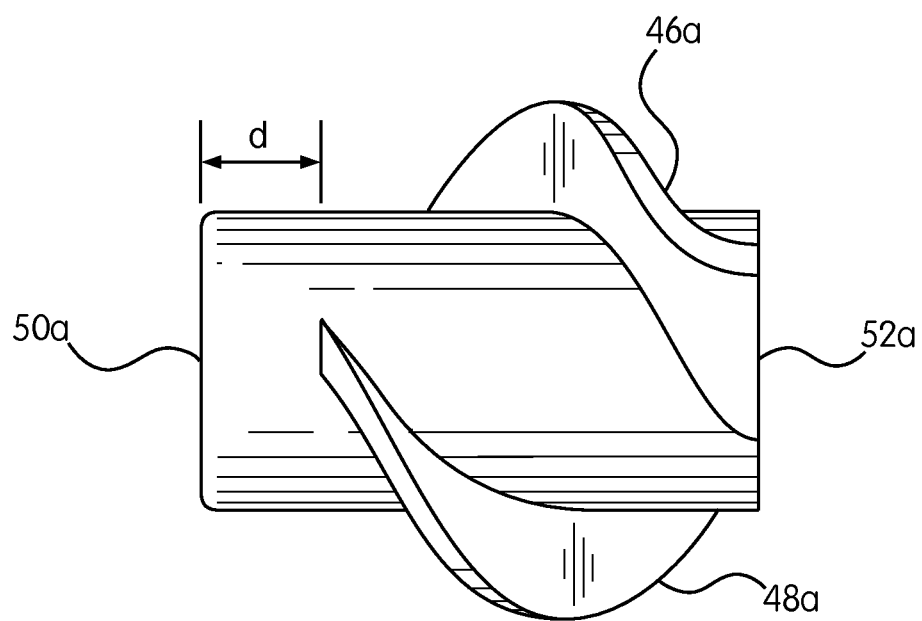
FIG. 6A is a side view of a stalk roll spiral of FIG. 5.
Figure 6B:
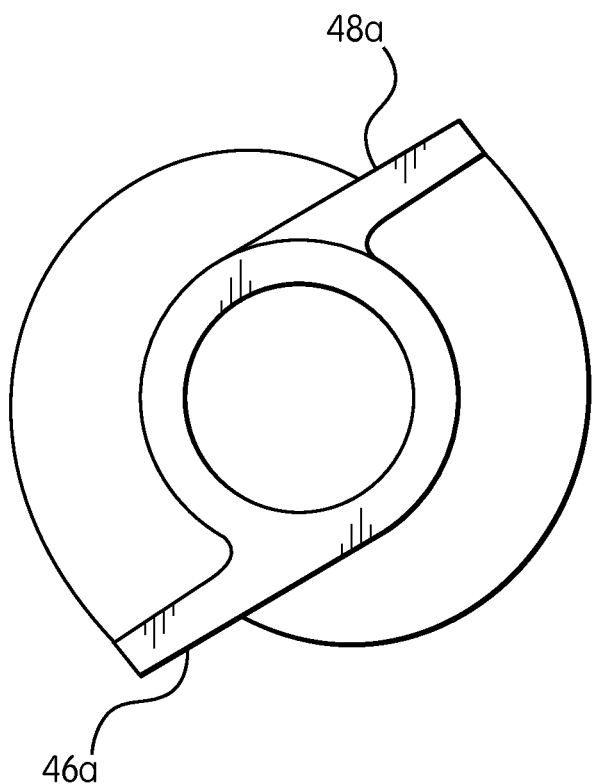
FIG. 6B if a front elevation view of the stalk roll spiral of FIG. 6A.

FIGS. 6A and 6B illustrate various views of the stalk roll spiral of FIG. 5. FIG. 6A is a perspective view showing the front edge 50a of the stalk roll spiral and the back edge 52a of the stalk roll spiral. As indicated in the figure, the secondary helical flight 48 is shown with its starting point axially displaced (i.e., along a longitudinal axis of the stalk roll spiral) from the front edge 50a of the stalk roll by a distance d. FIG. 6B shows an end on view of the stalk roll spiral of FIG. 5 viewed from the rear of the stalk roll spiral.

Figure 7:
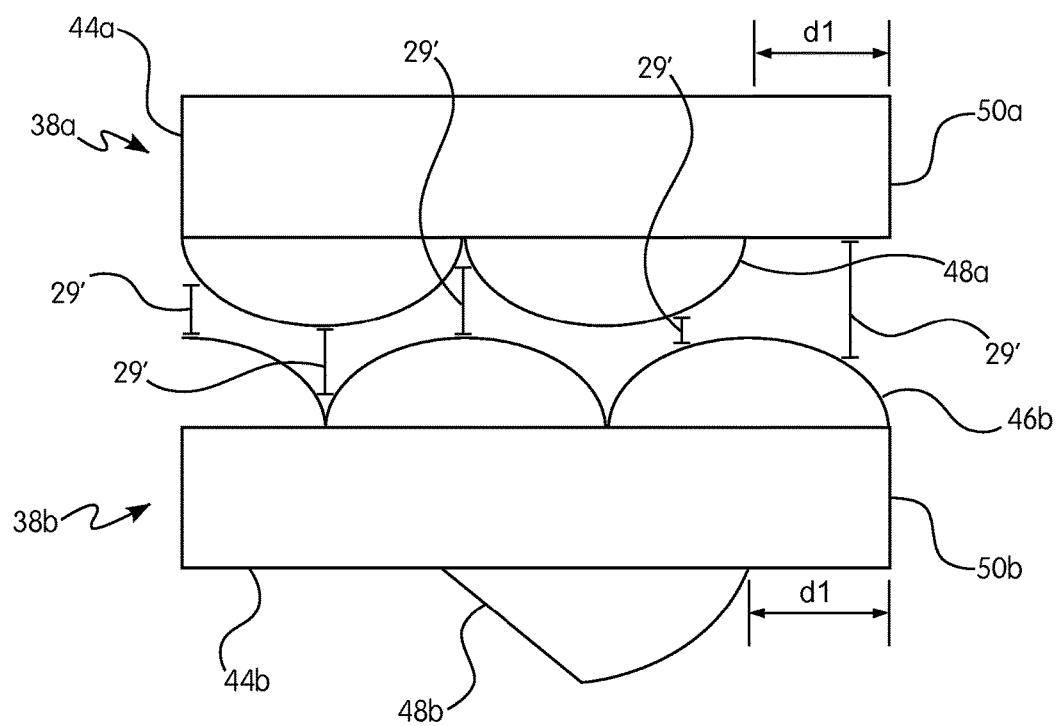
FIG. 7 is a schematic bottom view of a pair of stalk rolls in accordance with an aspect of the subject application.

FIG. 7 provides a side schematic view of a pair of stalk roll spirals such as those illustrated in FIG. 5. The stalk roll spirals include central bodies 44a and 44b and a primary helical flight 46b and a secondary helical flight 48a. The front most end of the primary helical flight 46b starts at the front edge 50b of the stalk roll spiral. The front most end of the secondary helical flight 48a starts at a point axially spaced by a distance d1 from the front edge 50a of the stalk roll.

As indicated in FIG. 7, there is a gap 29' between the first stalk roll spiral 46a and the second stalk roll spiral 46b. The width of the gap 29' varies axially along the stalk rolls. The particular width of gap 29' may be selected based on the specific characteristics of the crop type or field of crop being harvested.

In accordance with certain aspects of the subject application the position of the front most end of the secondary helical flight is spaced from the front edge of the second stalk roll an axial distance traversed by about a quarter turn of the primary helical flight on the stalk roll. Additionally, the front end of the secondary helical flight of the first stalk roll is spaced from the front end of the primary helical flight of the second stalk roll by an axial distance traversed by about a quarter turn of the primary helical flight of the first stalk roll.

In certain aspects the front most edge of the secondary helical flight is displaced relative to the front edge of the stalk roll spiral by other distances. Various displacements may be used depending on suitability of the dimensions of the stalk roll and the characteristics of the crop being harvested. In certain aspects of the subject application there are more than one primary helical flight (that is a helical flight that begins at the front edge of the stalk roll). In other aspects of the subject application there are more than one secondary helical flights (that is helical flights that begin at a point displaced axially with respect to the front edge of the stalk roll).

In operation, the first stalk roll and the second stalk roll each rotate in opposite directions. As a result of the gap 29' which is larger than conventional gaps as a result of the axial spacing of the front most edge of the secondary helical flight, corn stalks can more easily enter the row units. As a corn stalk enters gap 29' (FIG. 8) between the two stalk rolls, the primary helical flight of the first stalk roll engages the corn stalk and exerts a force that pulls the corn stalk downward and also urges the corn stalk further into the gap 29' towards the secondary helical flight of the second stalk roll. Thus, the force exerted by the flights of the stalk rolls pulls the corn down and away from the two stripping plates while also urging the corn stalk towards the back section of the stalk rolls.

Figure 8:
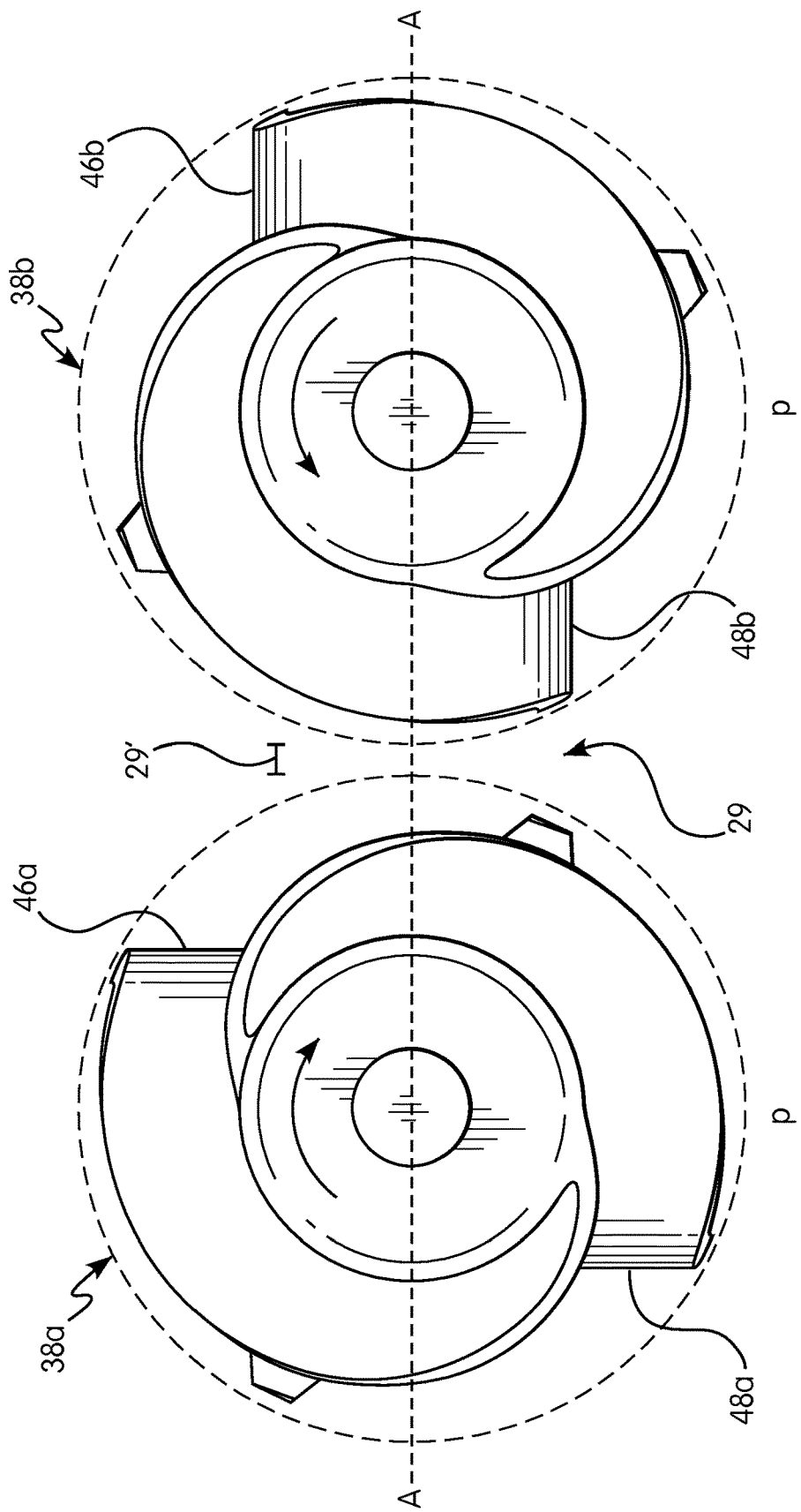
FIG. 8 is a front elevation view of a pair of stalk roll spirals in operation in accordance with an aspect of the subject application.

FIG. 8 is a front end view of the two stalk roll spirals 38a, 38b. FIG. 8 provides a view from the perspective of a corn stalk entering the gap 29'. As the two stalk roll spirals counter-rotate (as indicated in the figure by the rotation lines) the primary helical flight of the first stalk roll spiral engages the corn stalk. The primary helical flight 46a of stalk roll 38a and the primary helical flight 46b of stalk roll 38b are positioned on respective stalk rolls so that the two flights are out of phase with respect to one another. In other words, a rotation of the primary helical flight is out of phase with a rotation of the secondary helical flight. In certain aspects, the rotation of the primary helical flight of the first stalk roll and the rotation of the secondary helical flight of the second stalk roll will be about 180 degrees out of phase relative to each other. In such aspects the primary helical flight of the first stalk roll and the secondary helical flight of the second stalk roll will each pass closely by each other as they rotate. That is, the two helical flights (i.e., the primary helical flight of the first stalk roll and the secondary helical flight of the second stalk roll) will simultaneously pass through a horizontal plane A that is defined by the two stalk rolls. In certain other aspects a rotation of the primary helical flight of one stalk roll is about 45 degrees out of phase with a rotation of the secondary helical flight of the other stalk roll. The phase difference between the two (primary and secondary flights on the first and second stalk rolls) determines the axial length that is traversed by the corn stalk as it is pushed backward by the primary helical flight before engaging the secondary helical as the secondary helical flight rotates into the gap.

As each stalk roll rotates the helical flights on the stalk roll define an overall rotational profile "p" for each stalk roll, defining a gap 29 there between. That is, as each of the two stalk rolls complete a 360 degree rotation the outer edges of the helical flights on the stalk rolls define a rotational profile that extends along the length of each the stalk roll. Thus there is a gap 29' between the two rotational profiles that varies in width along the length of the stalk rolls. In accordance with certain aspects the width of the gap at the distal ends (or front ends) of the stalk roll spirals is greater than the width of the gap at the point where the secondary helical flight begins (that is, at a distance d1 from the front end of the central body of the stalk roll). In particular, in such an aspect, the first stalk roll rotates defining a first rotational profile and the second stalk roll rotates defining a second rotational profile. Furthermore, a gap between the distal ends of the first and second rotational profiles is greater than a gap between the first and second rotational profiles at the position of the front most end of the secondary helical flight.

In accordance with an aspect of the subject disclosure, when the pair of stalk rolls are rotated to the position shown in FIG. 7, the gap 29' about the front most end portion of the stalk rolls is configured to have a width about 100% larger or about twice as larger than a width of the gap 29' starting at the front most edge of the secondary helical flight 48a.

In accordance with another aspect of the subject disclosure, when the pair of stalk rolls are rotated to the position shown in FIG. 7, the gap 29' about the front most end portion is sized to be about equal to a width of a stalk roll body e.g., 44a.

Figure 9:
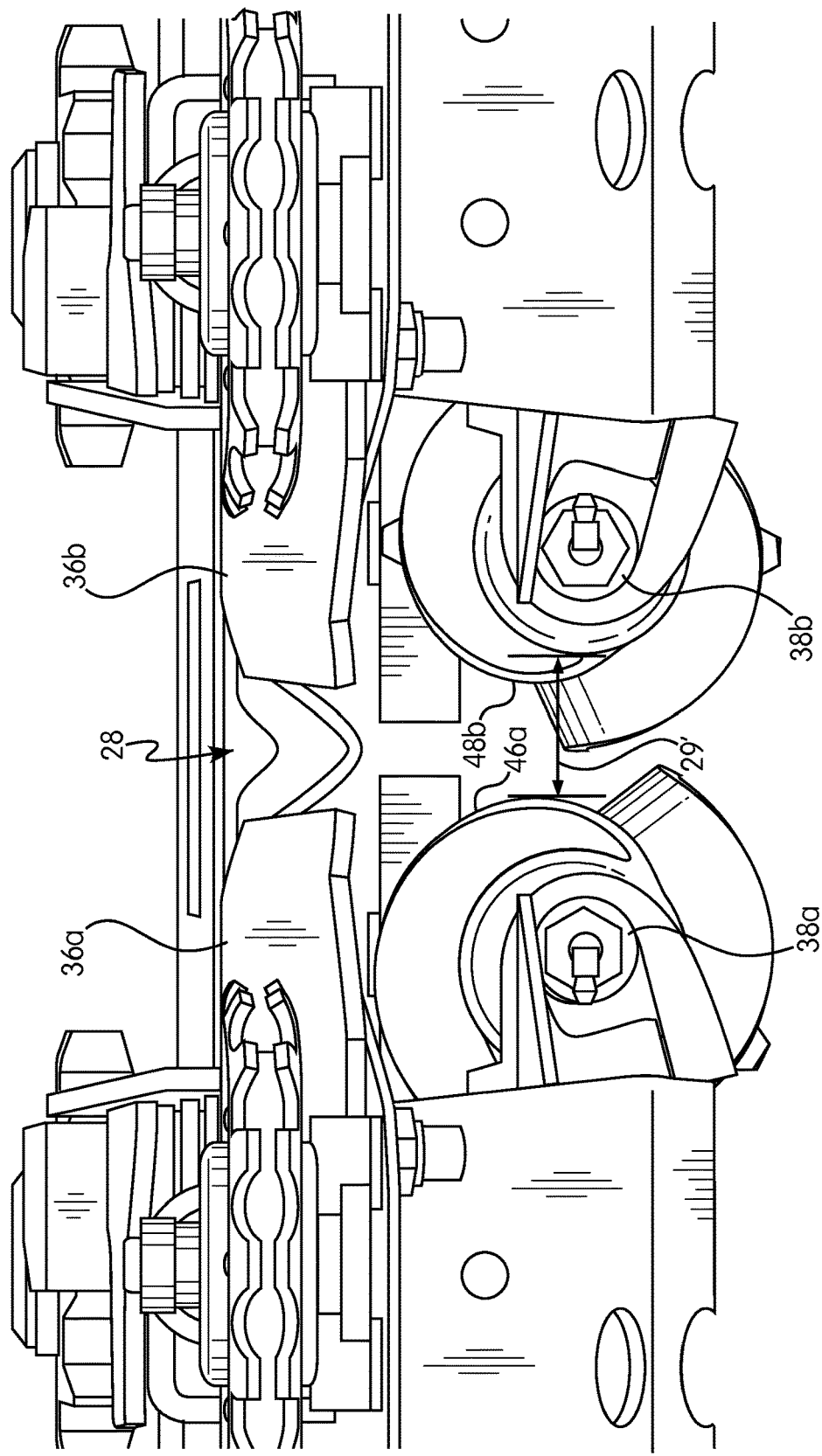
FIG. 9 is a partial front perspective view of the row unit of FIG. 2.

In accordance with yet another aspect of the subject disclosure, when the pair of stalk rolls are rotated to the position shown in FIG. 9, the gap about the front most end portion of the stalk rolls is sized to be larger than the gap 28 width defined by the stripping plates 36a, 36b. Additionally, the gap 29', as shown in FIG. 9, represents the gap width at the front most edge of secondary helical flight 48b, which is also sized to be larger than the gap 28 defined by the stripping plates. For example, the gap 29' and the gap about the front most end portion of the primary helical flight 46a can be configured to be 50% larger, twice as large, or some multiple of the size of the stripping plate gap 28. Furthermore, the gap 29' decreases in size as it extends beyond the front most edge of the secondary helical flights and is configured to be smaller than the gap 28 of the stripping plates. This combination of sizing of the gap 29' (from larger to smaller than gap 28) as it travels along a longitudinal length of the stalk rolls advantageously allows for improved feeding of stalks into the row units.

Figure 10:
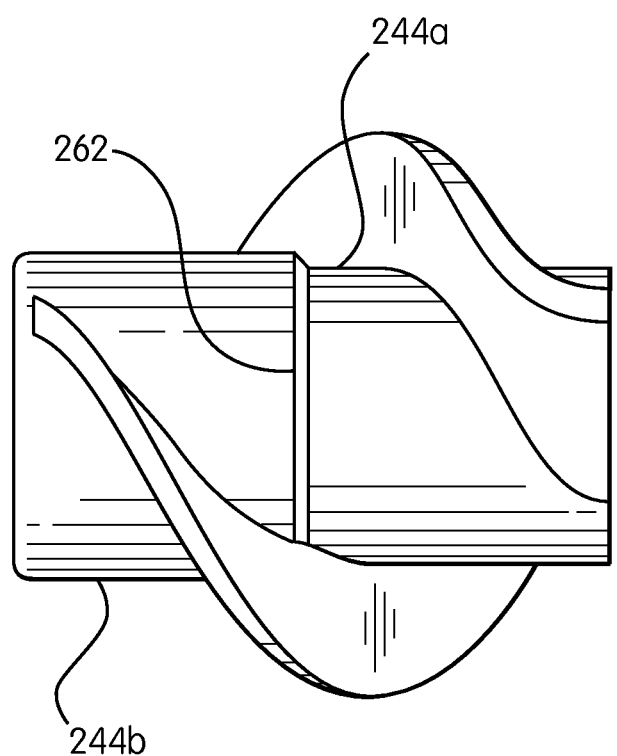
FIG. 10 is a side view of a stalk roll spiral in accordance with an aspect of the subject application.

In accordance with other aspects the central body may be comprised of more than one section each of a different diameter. FIG. 10 is a perspective view of a stalk roll spiral in accordance with such an aspect. As illustrated in FIG. 10, at a position 262 the cylindrical body changes diameter from the diameter of central body portion 244a to the diameter of central body portion 244b. That is, central body portion 244b has a diameter that is larger than the diameter of central body portion 244a. In other words, the cylindrical body includes a first section 244a having a first diameter and a second section 244b having a second diameter greater than the first diameter.

Figure 11:
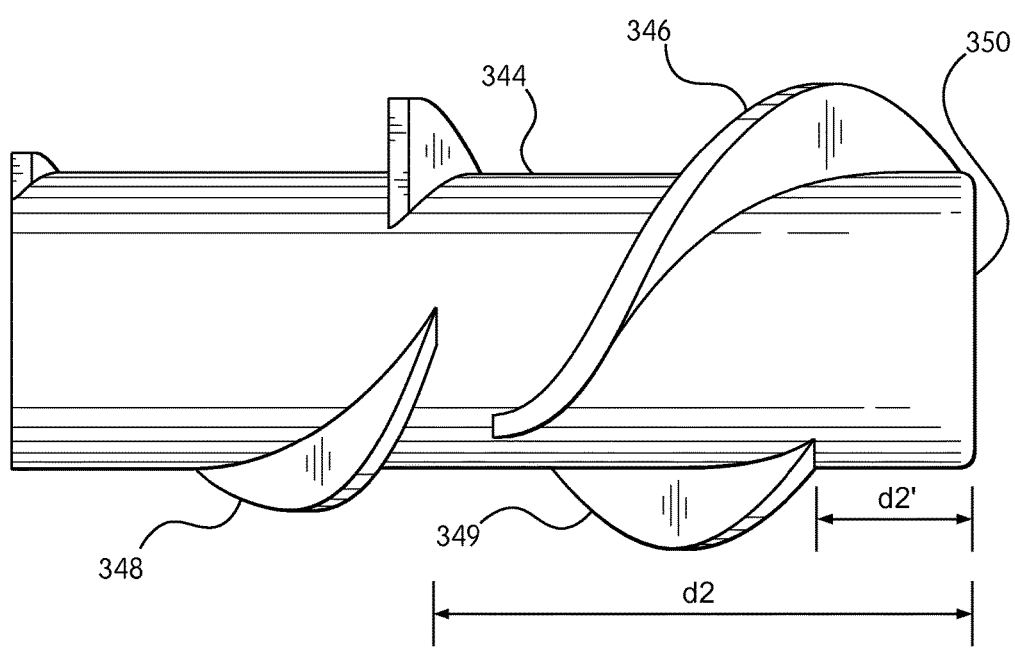
FIG. 11 is a side view of a stalk roll spiral in accordance with another aspect of the subject application.

FIG. 11 is a side view of a stalk roll spiral in accordance with yet another aspect of the subject application. The stalk roll spiral has a cylindrical body 344, a first helical flight 346, a second helical flight 348 and a third helical flight 349. The first helical flight has a front end that starts at a front edge 350 of the cylindrical body. The second helical flight has a front end that starts at a position d2 that is axially displaced from the front edge of the cylindrical body. The third helical flight has a front end that starts at a position d2' that is axially displaced from the front edge of the cylindrical body. In an aspect such as illustrated by FIG. 11 the distance d2' is less than the distance d2. The three (or more) helical flights on a rotating stalk roll spiral generates a more substantially uniform rotational profile along the axis of the stalk roll. Such a uniform rotational profile is particularly suitable for certain crop that require more constant stalk roll interaction during row unit processing. Alternatively, the third helical flight can be configured to have a front most end starting at a front end of the cylindrical body.

A stalk roll spiral as illustrated in FIG. 11 is suitable for use in a row unit as illustrated in FIGS. 2 and 3. The addition of the third helical flight 349 that is positioned axially between the first helical flight and the second helical flight facilitates the processing of the crop by the stalk rolls. In particular, the third helical flight provides an additional force as it engages the corn stalk (or other crop) while the crop is urged further along towards the back of the stalk roll. In certain aspects the front end of the second helical flight is positioned circumferentially offset by about 90-180 degrees and preferably by about 120 degrees on the cylindrical body from the front end of the first helical flight.

Figure 12:
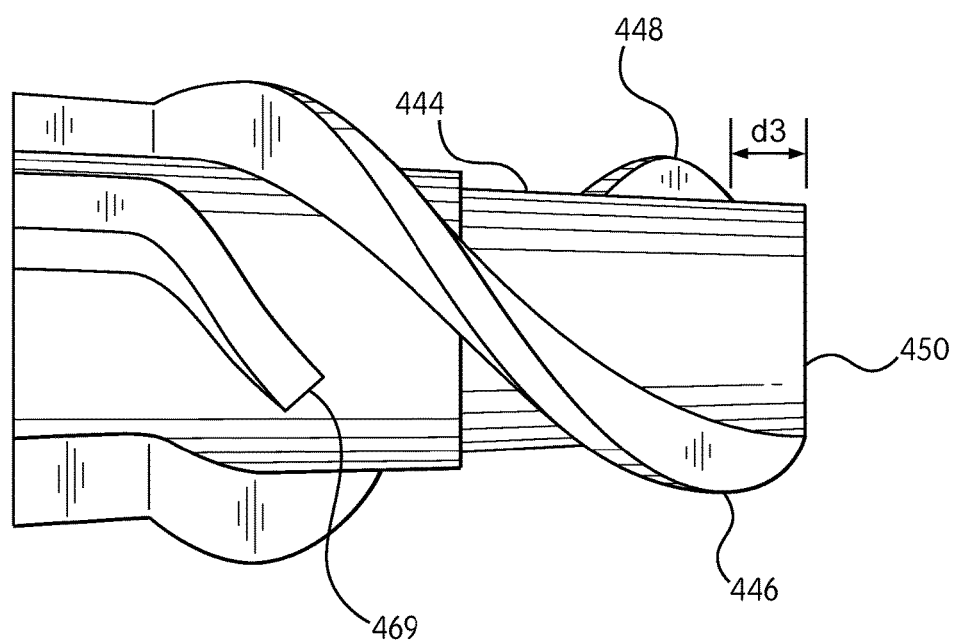
FIG. 12 is a side view of another stalk roll spiral in accordance with an aspect of the subject application.

In accordance with certain aspects of the subject disclosure the central body of the stalk roll spiral includes a cylindrical section and a frustoconical section as shown in FIG. 12. The stalk roll spiral has a central body 444 that includes a cylindrical section and a frustoconical section. The stalk roll spiral also includes a first helical flight 446, a second helical flight 448 and a third helical flight 449. Each of the first, second and third helical flights has its forward most end starting on the frustoconical section of the central body. Specifically, the first helical flight has a front end that starts at a front edge 450 of the central body. The second helical flight has a front end that starts at a position d3 that is axially displaced from the front edge of the central body. The third helical flight 449 is axially spaced from the front end further than the distance d3. The first and second helical flights are also circumferentially offset from one another by about 120-240 degrees and preferably about 180 degrees. The third helical flight is circumferentially offset from either the first or second helical flights by about 15-100 degrees and preferably by about 45 degrees.

Figure 13:
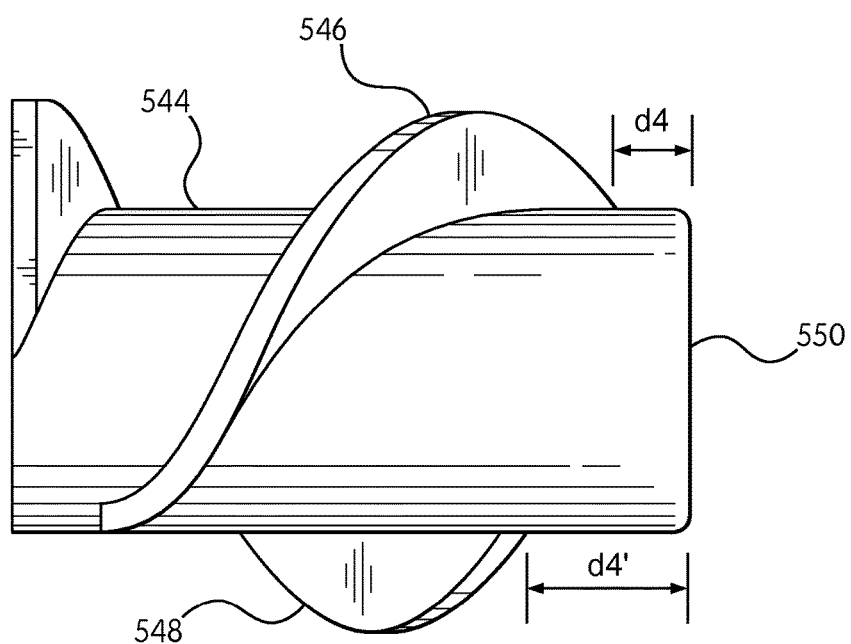
FIG. 13 is a side view of a stalk roll spiral in accordance with a further aspect of the subject application.

FIG. 13 is a schematic view of a stalk roll spiral in accordance with a further aspect of the subject application. The stalk roll spiral has a central body 544, a first helical flight 546 and a second helical flight 548. The first helical flight has a front end that starts at a position d4 that is displaced axially from a front edge 550 of the central body. The second helical flight has a front end that starts at a position d4' that is axially displaced from the front edge of the central body. A stalk roll as illustrated in FIG. 13 is suitable for use in a row unit in tandem with another similar stalk roll. In such a row unit the front edge of each of the stalk rolls will be parallel and the same distance from the back of the header in which the row unit is mounted.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A row unit for a header of an agricultural harvester comprising:
   a frame;
   first and second spaced apart stripping plates mounted on the frame;
   a first stalk roll mounted to the frame adjacent the first stripping plate, the first stalk roll including a primary helical flight having a front end starting at a front edge of a cylindrical front end of the first stalk roll; and
   a second stalk roll mounted to the frame adjacent the second stripping plate, the second stalk roll including a secondary helical flight that is helical throughout its entire extent and a front end starting at a position axially spaced from a front edge of a cylindrical front end of the second stalk roll,
   wherein the front end of the secondary helical flight of the second stalk roll is axially spaced from the front edge of the second stalk roll a distance equal to about an axial spacing from the front end of the first stalk roll of a first maximum outer diameter of a rotational profile of the primary helical flight of the first stalk roll.

2. The row unit of claim 1, wherein a rotation of the primary helical flight is out of phase with a rotation of the secondary helical flight.

3. The row unit of claim 1, wherein a rotation of the primary helical flight is about 45 degrees out of phase with a rotation of the secondary helical flight.

4. The row unit of claim 1, wherein the first stalk roll rotates defining a first rotational profile and the second stalk roll rotates defining a second rotational profile, and wherein a gap between distal ends of the first and second rotational profiles is greater than a gap between the first and second rotational profiles at the position of the front end of the secondary helical flight.

5. The row unit of claim 1, wherein the position of the front end of the secondary helical flight is spaced from the front edge of the second stalk roll an axial distance traversed by about a quarter turn of the primary helical flight.

6. The row unit of claim 1, wherein the first stalk roll further includes a secondary helical flight having a front end starting at a position axially spaced from the front edge of the first stalk roll, and the second stalk roll further includes a primary helical flight having a front end starting at the front edge of the second stalk roll.

7. The row unit of claim 6, wherein the front end of the secondary helical flight of the first stalk roll is spaced from the front end of the primary helical flight of the second stalk roll by an axial distance traversed by about a quarter turn of the primary helical flight of the first stalk roll.

8. The row unit of claim 6, wherein a rotation of the secondary helical flight of the first stalk roll is about 180 degrees out of phase with a rotation of the primary helical flight of the second stalk roll.

9. The row unit of claim 6, wherein the front ends of the primary helical flights are in a diametrically opposed position in relation to the front ends of the secondary helical flights.

10. The row unit of claim 6, wherein the first and/or second stalk rolls further includes a third helical flight.

11. The row unit of claim 10, wherein the third helical flight has a front end starting at a position axially spaced from the front edge of the first and/or second stalk rolls.

12. The row unit of claim 10, wherein the third helical flight has a front end starting at the front edge of the first and/or second stalk rolls.

13. The row unit of claim 6, wherein the front ends of the secondary helical flights are circumferentially offset by about 120 degrees from the front ends of the primary helical flight.

14. The row unit of claim 1, wherein the first and/or second stalk rolls comprises a cylindrical body.

15. The row unit of claim 14, wherein the cylindrical body comprises a first section having a first diameter and a second section having a second diameter greater than the first diameter.

16. A row unit for a header of an agricultural harvester comprising:
 a frame;
 first and second spaced apart stripping plates mounted on the frame;
 a first stalk roll mounted to the frame adjacent the first stripping plate, the first stalk roll including a primary helical flight having a front end starting at a front edge of the first stalk roll and a secondary helical flight having a front end starting at a position axially spaced from the front edge of the first stalk roll; and
 a second stalk roll mounted to the frame adjacent the second stripping plate, the second stalk roll including a secondary helical flight having a front end starting at a position axially spaced from a front edge of the second stalk roll and a primary helical flight having a front end starting at the front edge of the second stalk roll,
 wherein the secondary helical flights of the first and second stalk rolls are helical throughout their entire extents, and
 wherein the front end of the secondary helical flight of the second stalk roll is axially spaced from the front edge of the second stalk roll a distance equal to about an axial spacing from the front end of the first stalk roll of a first maximum outer diameter of a rotational profile of the primary helical flight of the first stalk roll.

17. The row unit of claim 16, wherein the front end of the secondary helical flight of the first stalk roll is spaced from the front end of the primary helical flight of the second stalk roll by an axial distance traversed by about a quarter turn of the primary helical flight of the first stalk roll.

18. The row unit of claim 16, wherein a rotation of the secondary helical flight of the first stalk roll is about 180 degrees out of phase with a rotation of the primary helical flight of the second stalk roll.

* * * * *